United States Patent

Sugahara

[15] 3,677,558
[45] July 18, 1972

[54] OIL STRIPPING PISTON RING
[72] Inventor: Eisuke Sugahara, Tokyo, Japan
[73] Assignee: Nippon Piston Ring Co., Ltd., Tokyo, Japan
[22] Filed: Feb. 11, 1971
[21] Appl. No.: 114,552

[52] U.S. Cl..........................................................277/138
[51] Int. Cl.............................................................F16j 9/06
[58] Field of Search..................277/103, 138, 139, 140, 155, 277/163, 235 A

[56] References Cited

UNITED STATES PATENTS 3,066,943 12/1962 Brenneke.............................277/163
3,191,946 6/1965 Hamm...................................277/140
3,467,397 9/1969 Sugahara.............................277/139

Primary Examiner—Robert I. Smith
Attorney—George B. Oujevolk

[57] ABSTRACT

An oil stripping piston employed on an internal combustion engine, especially aimed at elevated contact pressure and drastic reduction of lubrication oil consumption, on which a hardened surface is provided either on the top or bottom rubbing surface of the oil stripping piston ring and on the back of said oil stripping piston ring. An expander is mounted in the position selected for even distribution of rubbing wear of the hardened surface and the base material of the piston ring for maintaining a constant wear step between the said two rubbing surfaces.

4 Claims, 5 Drawing Figures

Patented July 18, 1972

3,677,558

EISUKE SUGAHARA
INVENTOR.

BY George B. ~~~~~
ATTORNEY

OIL STRIPPING PISTON RING

BACKGROUND OF THE INVENTION

The present invention relates to an oil stripping piston ring to be employed on an internal combustion engine in which, either on the top rubbing surface of the oil stripping piston ring or on the bottom rubbing surface, a hardened surface is formed and an expander is inserted in an annular groove formed with a definite ratio on the back surface of the said oil stripping piston ring, thus providing both of said rubbing surfaces with a constant wear step.

BRIEF DESCRIPTION OF THE PRIOR ART

In the case of a conventional oil stripping piston ring, the peripheral rubbing surface is divided into two sections in the axial direction with an oil passage window between these two rubbing surfaces; on the back surface a groove of semi-circular shape is formed in which a coil expander is combined, thus attempting to achieve an elevated surface pressure and reduction of the consumption of lubricating oil.

However, on both rubbing surfaces of the oil stripping piston ring, a step ranging from approximately a few microns to 0.01 mm is necessarily created, caused by deformation of the cylinder, movements of the piston ring, etc. As this particular step is not uniformly built in the peripheral direction, as shown in FIG. 1, the top part is formed high and the bottom part is formed low, as shown in FIG. 2. Further, sometimes the top becomes formed lower than the bottom, as shown in FIG. 3, showing a ununiform step resulting from a defective effect on economy of the lubricating oil consumption.

OBJECT OF THE INVENTION

The object of this invention is to offer an oil stripping piston ring provided with an optimum orientation of a step. This means that all along the periphery of the oil stripping piston ring, the top part is formed high or low. Additionally, the ring is provided with the step maintained within a constant limit.

SUMMARY OF THE INVENTION

The present invention relates to an oil stripping piston ring provided with a hardened surface, either on the top rubbing surface of the ring, or on the bottom rubbing surface of the ring, with an expander being mounted on the back surface of said oil stripping piston ring in the position selected for even distribution of rubbing wear of the hardened surface and the base material of the piston ring in order to maintain a constant wear step between the two rubbing surfaces.

The invention, as well as other objects and advantages thereof will become more apparent from the following detailed description when taken together with the following detailed description, in which:

DETAILED DESCRIPTION OF THE INVENTION

Figure 1:
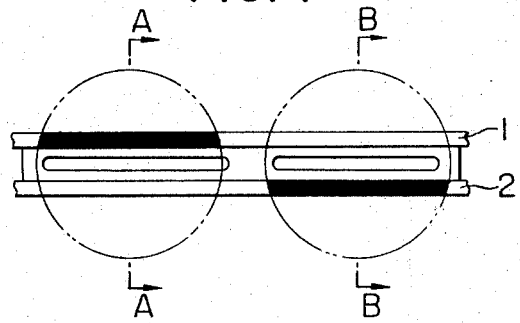
FIG. 1 represents an example of a conventional oil stripping piston ring actually in use and the two-point chain-line circles indicate the steps between top and bottom rubbing surfaces.
Figure 2:
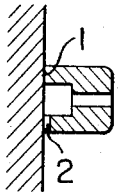
FIG. 2 represents a longitudinal sectional drawing showing a view A—A of FIG. 1.
Figure 3:
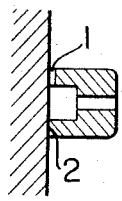
FIG. 3 represent a longitudinal sectional drawing showing a view B—B of FIG. 1; and, FIG. 4 and FIG. 5 represent longitudinal sectional front views of the oil stripping ring according to the present invention.
Figure 4:
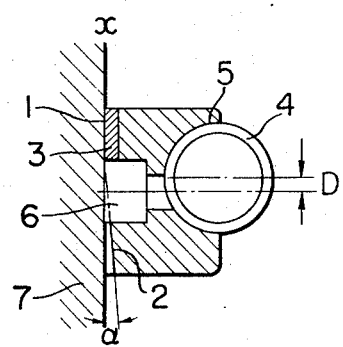
Figure 5:
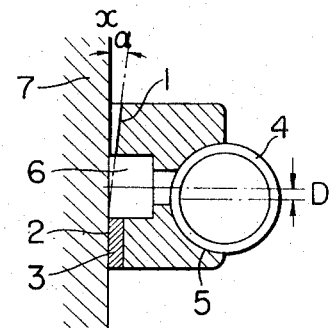

The detailed description of an embodiment of the present invention shall be made with reference to FIG. 4 and FIG. 5. For example, in case of a cast iron oil stripping piston ring, chromium plating 3 is applied only on the top rubbing surface 1 or only on the bottom rubbing surface 2 and further, on the back surface of the piston ring, in a position where the surface pressure distribution for maintaining a step caused by difference in wear of the chromium plated surface 3 and the cast iron surface is a constant value. That is to say, plating is applied to the position indicated by D, where the position is determined by the proportion of wear inflicted on the chromium layer 3 and on the basic material of the oil stripping piston ring. This proportion indicates the proportion of wear caused on the top and bottom surfaces of the rubbing surface of this particular piston ring in a definite period of time. A semi-circular groove 5 is provided and in this groove 5, a coil expander 4 is inserted, thus providing the entire piston ring periphery with uniform and proper amount of wear step.

In the drawings, 6 represents an oil passage window; 7 represents a cylinder wall.

Whereas the present invention is constructed as it is described above, for example, when the top rubbing surface 1 of the oil stripping piston ring is provided with the chromium plated hard surface 3, and the bottom rubbing surface 2 is of the same material as the basic material of the piston ring, and further, in the position D on the side opposite the window 6 where the top and bottom rubbing surfaces 1 and 2, provide proportional wear against the cylinder wall 7, a coil expander 4 is inserted. The top and bottom rubbing surfaces 1 and 2 contact the cylinder wall 7 tightly, providing rubbing motions at the initial period of operation of the engine. However, with the deformation of the cylinder, movements of the piston and other similar motions, the bottom rubbing surface 2 of the cast iron material of the piston ring with lower hardness than the hardened surface 3 of the piston ring wears more, showing difference of wear with respect to X—X line through an angle of α. Then according to the difference of wear, which occurred in the hardened surface 3 and bottom rubbing surface 2, a certain step is to be created. However, as a coil expander 4 is inserted in the back of the ring in the position D where the position is selected so as to be in proportion to the wear of the hardened surface 3 and the bottom rubbing surface 2, the constant wear step is maintained and no further increase of the wear step takes place.

Under these circumstances, all along the periphery of the piston ring, a wear step of a proper value can be created in a uniform manner.

The oil tripping piston ring represented in FIG. 5 is so constructed that, on the bottom rubbing surface 2, a hard surface 3 such as a chromium plated layer is created and the top rubbing surface 1 is of the same material as the basic material of the piston ring. These two rubbing surfaces maintain contact with the cylinder wall in a tight manner on their parallel surfaces and on the other hand, the coil expander 4 is inserted at the back in the position where the expanding face selected will be in proportion to the wear of the hardened surface of 3 and of the top rubbing surface 1. The operating condition is the same as that shown in FIG. 4, namely, a constant wear step can be maintained and a proper value of step can be provided uniformly all along the periphery.

Because of this construction, consumption of the lubricating oil can be reduced and at the same time, the wear step caused by the presence of the piston ring can be minimized with the result of improvement of performance of an internal combustion engine.

Further, the rubbing surface hardening process is not restricted only to chromium plating. A molybdenum film layer or nitriding hardening process can also be used, and the expander to be inserted in the oil stripping piston ring is not restricted only to the coil expander, as a wide range of expanders can also be used.

I claim:

1. An oil stripping piston ring member for a piston member wherein the inner front end surface of said ring member contacts said piston member in which a hardened surface is provided at least at one of the top or bottom rubbing surfaces of one of said members, and, on the outer back surface of said oil stripping piston ring an expander is mounted in a position selected fro even distribution of rubbing wear of both the hardened surface and the basic material of the piston ring so as to maintain a constant wear step between said two rubbing surfaces.

2. A piston ring as claimed in claim 1, wherein said expander is a coil expander.

3. A piston ring as claimed in claim 1, wherein said hardened surface is selected from the group consisting of chromium plating, a molybdenum film layer or a nitrided hardened surface.

4. In combination, a piston member with a piston cylinder (7), an oil stripping ring with an inner window (6) for oil passage, and to (1) and bottom (2) rubbing surfaces above and below said window, an outer semi-circular groove (5) on the outer side of said ring, a hard component (3) at one of said top or bottom rubbing surfaces, and, an expander (4) in said groove biased to urge said rubbing surfaces in constant contact with said piston cylinder (7) compensating for wear and tear thereon.

* * * * *